(12) United States Patent
Yin

(10) Patent No.: US 8,623,319 B2
(45) Date of Patent: Jan. 7, 2014

(54) PROCESS FOR DIRECTLY PRODUCING SULFUR TRIOXIDE AND SULFURIC ACID USING GYPSUM AS RAW MATERIAL

(76) Inventor: Xiaolin Yin, Changsha (CN)

( * ) Notice: Subject to any disclaimer, the term of this patent is extended or adjusted under 35 U.S.C. 154(b) by 0 days.

(21) Appl. No.: 13/808,402

(22) PCT Filed: Jul. 5, 2010

(86) PCT No.: PCT/CN2010/074979
§ 371 (c)(1),
(2), (4) Date: Jan. 4, 2013

(87) PCT Pub. No.: WO2012/003619
PCT Pub. Date: Jan. 12, 2012

(65) Prior Publication Data
US 2013/0108541 A1    May 2, 2013

(51) Int. Cl.
*C01B 17/74* (2006.01)
(52) U.S. Cl.
USPC ............ 423/522; 423/530; 423/532; 423/533
(58) Field of Classification Search
USPC .................................. 423/522, 530, 532, 533
See application file for complete search history.

(56) References Cited

U.S. PATENT DOCUMENTS

| 2,528,103 | A | * | 10/1950 | Willson | 423/522 |
| 5,766,339 | A | * | 6/1998 | Babu et al. | 106/745 |
| 6,231,767 | B1 | | 5/2001 | Krofchak et al. | |
| 2013/0108541 | A1 | * | 5/2013 | Yin | 423/525 |

FOREIGN PATENT DOCUMENTS

| CN | 101041439 A | 9/2007 |
| CN | 101891160 A | 11/2010 |
| GB | 549340 A | 11/1942 |

OTHER PUBLICATIONS

International Search Report, PCT/CN2010/074979, Apr. 7, 2011.

* cited by examiner

*Primary Examiner* — Timothy Vanoy
(74) *Attorney, Agent, or Firm* — Woodard, Emhardt, Moriarty, McNett & Henry LLP

(57) ABSTRACT

Provided is a process for directly producing sulfur trioxide and sulfuric acid from gypsum. Sulfur trioxide is directly substituted with silicon dioxide by thermal or light-quantum activation, which is assisted with catalytic activation, while restraining reducing atmosphere and removing the resultant sulfur trioxide in time. The resultant sulfur trioxide is then used as raw material to produce sulfuric acid by a well-known method in prior art. The process has the advantages of simplified operational steps, little investment, low energy consumption and manufacturing cost, and low environmental pollution.

20 Claims, No Drawings

PROCESS FOR DIRECTLY PRODUCING SULFUR TRIOXIDE AND SULFURIC ACID USING GYPSUM AS RAW MATERIAL

TECHNICAL FIELD

The present invention relates to a process for producing sulfur trioxide and sulfuric acid, and more specifically, to a process for directly producing sulfur trioxide and sulfuric acid using gypsum as raw material.

TECHNICAL BACKGROUND

Sulfur trioxide and sulfuric acid are important basic chemical raw materials. Currently, the process for producing sulfuric acid generally includes two steps: the first step comprises producing sulfur dioxide by the combustion of sulfur, by the calcination of pyrite, or by the decomposition of gypsum under reducing atmosphere; and the second step comprises oxidizing the produced sulfur dioxide into sulfur trioxide at a high temperature under the presence of catalyst, absorbing sulfur trioxide by concentrated sulfuric acid, and then producing sulfuric acid with a concentration as required. The above process for producing sulfur acid is of complex operation, high cost in investment and operation, and high energy consumption. Especially, it results in a serious environmental pollution.

Thermal decomposition of pyrosulfate is generally used as the existing process for producing sulfur trioxide in the laboratory. However, it is difficult to control the operation conditions of the process, and the producing cost is high. Also, the process is difficult to be used in mass production.

Besides, there is an increasing lack in natural sulfur and pyrite, whereas the reserves of natural gypsum are large. In particular, industrial waste gypsum, which is in a very large amount, has not been sufficiently recycled, and further leads to a serious environmental pollution.

SUMMARY OF THE INVENTION

The technical problem to be solved by the present invention is to overcome the above defects in the prior arts, and provide a process for directly producing sulfur trioxide and sulfuric acid using gypsum as raw material. The process consists of simple steps, and has a low investment, a low energy consumption and a low manufacturing cost, without serious environmental pollution.

The technical solution of the present invention is based on the following principles. It is well known that the chemical component of gypsum is calcium sulfate, the formula of which is $CaSO_4$. It is generally acknowledged that it is divalent calcium that combines with negative divalent sulfate ion so as to form sulfate. However, the inventor believes that $CaSO_4$ can also be considered as a compound formed by the combination of one CaO molecular and one $SO_3$ molecular. In fact, sulfur trioxide can react with calcium oxide to directly generate calcium sulfate under suitable conditions, and the above process should be reversible under certain conditions.

On the other hand, at present, the process for hydrothermal synthesis of calcium silicate using finely ground silica sand (i.e. silica dioxide) and lime (i.e. the mixture of calcium oxide and calcium hydroxide) is used in the production of industrial sand-lime bricks and calcium silicate boards. Thermodynamic analysis and laboratory research show that calcium silicate is more stable than calcium sulfate, and all of calcium sulfate, calcium silicate, calcium oxide, sulfuric trioxide, sulfuric acid and silica dioxide can exist in a stable manner.

Research shows that, gypsum can react with silica dioxide to generate sulfur trioxide and calcium silicate (rankinite) through activation with overheated water vapor media higher than or equal to 350° C. in the presence of suitable catalytic activator; sulfur trioxide, sulfuric acid, water and vapor can co-exist in a balanced manner at a temperature higher than or equal to 340° C.; gypsum can also react with silica dioxide to generate sulfur trioxide and calcium silicate in the presence of suitable catalytic activator with a thermoelectric activation temperature higher than or equal to 500° C.; gypsum can also react with silica dioxide to generate sulfur trioxide and calcium silicate in the presence of suitable catalytic activator with a microwave quantum activation temperature higher than or equal to 300° C.; and gypsum can also react with silica dioxide to generate sulfur trioxide and calcium silicate if using coal power, fuel oil or gas to supply heat and thermally activating the homogeneous mixture of powders or lumps of gypsum, silica dioxide and catalytic activator at a temperature higher than or equal to 700° C. while restraining reducing atmosphere.

Based on the above understanding, in the present invention, gypsum, which is used as the raw material, is reacted chemically with silica dioxide to generate sulfur trioxide and calcium silicate (rankinite) through thermal activation or light quantum activation under the assistance of catalytic activation while restraining reducing atmosphere, and the reaction product sulfur trioxide is removed in time, then sulfuric acid is produced according to known methods using the reaction product sulfur trioxide as the raw material. The basic reaction equation is as follows:

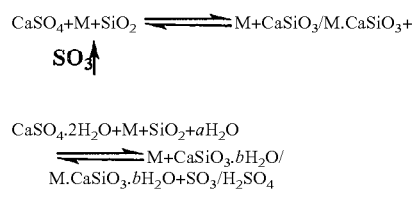

$$CaSO_4 \cdot 2H_2O + M + SiO_2 + aH_2O$$
$$\rightleftharpoons M + CaSiO_3 \cdot bH_2O/$$
$$M \cdot CaSiO_3 \cdot bH_2O + SO_3/H_2SO_4$$

wherein M is the catalytic activator, and a and b prefixed to $H_2O$ are 1, 2 or 3.

The heat source for said activation and the method of activation are selected from one of the following five Solutions:

Solution 1, using overheated water vapor with a temperature higher than or equal to 350° C. as the heat source for said thermal activation; directly thermally activating the homogeneous mixture of powders or lumps of gypsum, silica dioxide and catalytic activator in the reaction vessel via media; and unintermittently exporting the mixture comprising the resultant sulfur trioxide and water vapor containing acid.

Solution 2, using electric furnace as the heat source for said thermal activation; controlling the temperature of the thermoelectric activation to be higher than or equal to 500° C.; directly thermally activating the homogeneous mixture of powders or lumps of gypsum, silica dioxide and catalytic activator; and unintermittently extracting the resultant sulfur trioxide gas at a negative pressure. The method for thermoelectric activation can be unintermittent or intermittent electric furnace process, and the specific activation temperature and capacity of the unintermittent or intermittent electric furnace process can be determined according to its economy requirement.

Solution 3, using microwave quantum activation as said method of activation; controlling the temperature to be higher than or equal to 300° C.; directly activating the homogeneous mixture of powders or lumps of gypsum, silica dioxide and catalytic activator; and unintermittently extracting the resultant sulfur trioxide gas at a negative pressure. The microwave activation process can be intermittent or unintermittent microwave oven process.

Solution 4, using the combustion of coal powder, fuel oil or gas as the heat source for said thermal activation; under a temperature higher than or equal to 700° C., thermally activating the homogeneous mixture of powders or lumps of gypsum, silica dioxide and catalytic activator in a multi-stage cyclone preheater rotary kiln, a multi-stage cyclone preheater boiling furnace, an annular kiln or a tunnel kiln; and extracting gas containing the resultant sulfur trioxide. In said combustion of coal powder, fuel oil or gas for thermal activation, fuel should be controlled to be fully oxidized and combusted. Under the condition that can prevent a reducing atmosphere in the system, existing processes for preparing sulfuric acid from gypsum in the field, such as the multi-stage cyclone preheater rotary kiln process or the multi-stage cyclone preheater rotary boiling furnace process can be used, so that the steps for catalytic conversion and absorption of sulfur dioxide can be omitted; components such as CaO can be supplemented into the solid powder in which sulfur trioxide has been replaced, and cement clinker can be prepared using high temperature flame from fuel combustion; the homogeneous mixture of lumps of gypsum, silica dioxide and catalytic activator can be thermally activated in industrial kilns such as annular kiln or tunnel kiln, and the homogeneous mixture of gypsum, silica dioxide and catalytic activator is thermally activating at a temperature of higher than or equal to 700° C., so that sulfur trioxide is replaced and thus the solid product rankinite (calcium silicate) is obtained at the same time;

Solution 5, using combined activation process as the heat source for said thermal activation; using the combustion of fuel to preheat the homogeneous mixture of powders or lumps of gypsum, silica dioxide and catalytic activator to a temperature higher than or equal to 300° C.; then feeding the mixture into the reaction vessel for being activated by heated water vapor as heat media, or feeding the mixture into the reaction furnace for being activated by microwave quantum or plasma, and preparing sulfur trioxide or further preparing sulfuric acid.

Said catalytic activator, i.e. M in the above chemical reaction equation, means the catalytic active substance that can effectively reduce the activation energy of said reaction in which calcium sulfate and silica dioxide are involved, enhance the positive reaction speed, and restrain the generation of byproduct sulfer dioxide. Generally, the catalytic activator can be the mixture of at least two of oxides, hydroxides or salts of metals selected from a group consisting of lithium, sodium, potassium, magnesium, strontium, iron, nickel, cobalt, vanadium, chromium, cerium, lanthanum and cesium, such as the mixture of at least two of potassium oxide, potassium hydroxide, potassium sulfate, cesium sulfate, ferric oxide, cerium dioxide, vanadium pentoxide. The mixture ratio of each component is not restricted in any manner.

Said homogeneous mixture of powders or lumps of gypsum, silica dioxide and catalytic activator means the reactant prepared in advance with the following mass ratio: 30 to 75% gypsum, 20 to 69% silica dioxide, and 0 to 5.0% catalytic activator. After being prepared according to said ratio, these ingredients are mixed and grinded into powders with less than 30% residue on a sieve of 200 meshes. Alternatively, each solid ingredient is individually grinded into powders with less than 30% residue on a sieve of 200 meshes, and then all ingredients are mixed homogeneously. Said lumps mean spherical or strip-like or lumpish or plate-like reactants formed by plasticization after adding 1 to 5% plasticizing binder bentonite or water glass into the powdery reactant mixture. For plasticizing the reactant mixture in form of powder into spherical or strip-like or lumpish or plate-like reactants, the main factor that should be taken into account, besides parameters of the reaction furnace process, is that calcium silicon bricks or calcium silicon boards as building material products can be directly obtained after preparation of sulfur trioxide.

Said gypsum is preferably dihydrate gypsum or anhydrite in natural gypsum, or desulfurized gypsum, phosphogypsum, fluorgypsum or lemon gypsum in industrial waste gypsum. Other waste gypsum with the grade of sulfur trioxide higher than 40% can also be used. The total content of carbon and other organic compounds in natural gypsum and industrial waste gypsum is preferably less than 1%; otherwise, it is better to remove carbon and other organic compound impurities by calcination. As to gypsum used for the activation process with overheated water vapor as media, dihydrate gypsum or anhydrous gypsum can be used. As to gypsum for other thermal activation processes or the light quantum activation process, anhydrous gypsum, i.e. anhydrite, is preferred. If the raw material is natural dihydrate gypsum or industrial waste gypsum, it is better to get rid of crystal water from the natural dihydrate gypsum or industrial waste gypsum to convert it into anhydrous gypsum, so as to mitigate corrosion.

Said silica dioxide can be silica sand, silica stone and high silica earth existing in nature, or chimney ash, i.e., silicon ash, generated in the production of industrial furnace smelted crystalline silicon or ferrosilicon, and waste glass as well, in which the total content of carbon and organic compounds is preferably less than 1%. Silica sand, silica stone, high silica earth and waste glass are suitably grinded into powers with less than 30% residue on a sieve of 200 meshes. Silicon ash generally has a fineness up to 1200 meshes, and is typically unnecessary to be grinded. Silicon ash possesses a very high specific surface area and a very high reaction activity. Less or no catalytic activator can be used for silicon ash. No catalytic activator can be used when waste glass powder having some certain components is used.

The main component of the reaction solid product is rankinite, which can be used as the raw material for producing building materials.

The present invention completely overcomes the boundary of conventional process for preparing sulfuric acid. That is, the industrial process for preparing sulfuric acid, which comprises firstly preparing sulfur dioxide, converting it into sulfur trioxide under the presence of catalyst, and then preparing sulfuric acid, is abandoned. In contrast, in the present invention, gypsum is used as the raw material, and a process of activation replacement while restraining reduction is used, so that the reaction course is changed, and sulfur trioxide and sulfuric acid can be directly prepared. The process of the present invention is featured by simple operation steps, low requirement for equipments, low investment, low energy consumption, low manufacturing cost, and little environmental pollution.

Meanwhile, the process of the present invention is also important for fully exploiting gypsum resources, especially exploiting and utilizing of industrial waste gypsum resources, reducing the pollution of industrial waste gypsum on environment and developing the recycling economy.

EMBODIMENTS

The present invention will be further illustrated in combination with the following examples.

EXAMPLE 1

Overheated water vapor with a vapor pressure of 4.0 MPa and a vapor temperature of 350° C. is used as the heat source, and dihydrate gypsum and silicon ash are used as the raw materials. Firstly, dihydrate gypsum and silicon ashare are mixed with a mass ratio of 69.5%:30.5% and grinded together, obtaining powder with 9.1% residue on a sieve of 200 meshes. Then, the powder are activated in an acid-proof reaction vessel with vapor media, and the mixture comprising reaction resultant sulfur trioxide and water vapor containing acid is exported unintermittently to produce sulfuric acid. Analysis on stable acid solution in the middle part shows the content of sulfuric acid is 17.3%, and no sulfurous acid is detected. Chemical analysis shows the solid resultant after reaction comprises 0.3% sulfur trioxide, and diffraction analysis shows the main component thereof is calcium silicate hydrate.

EXAMPLE 2

Example 2 is the same as Example 1 except that, the temperature of heat source water vapor is 452° C., the mass ratio of gypsum dihydrate to silicon ash to catalytic activator is 75%:24.5%:0.5%, and the catalytic activator is the mixture of nickel nitrate and potassium sulfate with a mass ratio of 1:3. The content of sulfuric acid in stable acid solution in the middle part is 17.8%, and no sulfurous acid is detected. Chemical analysis shows the solid resultant comprises 2.7% sulfur trioxide, and diffraction analysis shows the main component thereof is calcium silicate hydrate.

Example 3

A supercritical boiler is used to heat the vapor to a temperature of 569° C. at the pressure of 25.1 MPa. The raw materials are desulfurized gypsum and silica sand. The catalytic activator is the mixture of potassium nitrate, vanadium pentoxide and cesium sulfate with a mass ratio of 7:2:1. Firstly, desulfurized gypsum is calcinated and dried to form anhydrite gypsum, then gypsum, silica sand and catalytic activator are mixed with the mass ratio of 30%:69%:1%, and are grinded together to form powder with 8.7% residue on a sieve of 200 meshes. Subsequently, the powder is activated in an acid-proof reactor vessel with water vapor media, and the mixture comprising reaction product sulfur trioxide and water vapor containing acid is exported unintermittently to produce sulfuric acid. Analysis on stable acid solution of middle part shows the content of sulfuric acid is 21.7%, and no sulfurous acid is detected. Chemical analysis shows the solid resultant comprises 1.8% sulfur trioxide, and diffraction analysis shows the main component thereof is rankinite.

EXAMPLE 4

An intermittent electric furnace is used, and the activation is carried out at a temperature controlled at 750±50° C. The raw materials are natural anhydrite and silica stone. The catalytic activator is the mixture of potassium carbonate, ceria, ferric oxide and potassium sulfate with the mass ratio of 3:2:2:1. Firstly, anhydrite, silica stone and catalytic activator are mixed with the mass ratio of 65%:34%:1%, and grinded together to form powder with 3.4% residue on a sieve of 200 meshes. Subsequently, the powder is thermoelectrically activated in the hermetic intermittent electric furnace at said temperature, and the gas product is unintermittently extracted at a negative pressure. The extract is condensed at about 28° C. to obtain semisolid, which comprises 98.7 wt % sulfur trioxide through chemical analysis. Chemical analysis shows the remaining solid resultant after reaction comprises 3.3% sulfur trioxide, and diffraction analysis shows the main component thereof is rankinite.

EXAMPLE 5

Example 5 differs from Example 4 only in that the activation temperature is controlled at 1000±50° C. The gas extracted at a negative pressure is condensed at about 28° C. to obtain semisolid, which comprises 98.5 wt % sulfur trioxide through chemical analysis. Chemical analysis shows the solid resultant comprises 3.1% sulfur trioxide, and diffraction analysis shows the main component thereof is rankinite.

EXAMPLE 6

Microwave quantum activation is used, and the temperature is controlled at 400±50° C. The raw materials are anhydrite and silica sand. The catalytic activator is the mixture of potassium hydrate, potassium sulfate, ceria, ferric nitrate and cesium sulfate with the mass ration of 2:3:2:2:1. Firstly, anhydrite, silica sand and catalytic activator are mixed with a mass ratio of 65%:33%:2%, and grinded together to form powder with 4.7% residue on a sieve of 200 meshes. Subsequently, the powder is activated in an intermittent microwave oven at said temperature for 18 min. The gas extracted at a negative pressure is condensed at about 30° C., obtaining fibrous solid. The condensed solid has a melting point of 62.0° C., and comprises 99.1 wt % sulfur trioxide through chemical analysis. Chemical analysis shows the remaining solid resultant comprises 1.3% sulfur trioxide, and diffraction analysis shows the main component thereof is rankinite.

EXAMPLE 7

Example 7 differs from Example 6 only in that the temperature is controlled at 650±50° C. The condensed fibrous solid obtained has a melting point of 62.5° C., and comprises 99.1 wt % sulfur trioxide. Chemical analysis shows the remaining solid resultant comprises 1.2 wt % sulfur trioxide, and diffraction analysis shows the main component thereof is rankinite.

EXAMPLE 8

A tunnel kiln is used, and oxygen-rich fuel oil is used to supply heat for activation. The temperature is controlled at 850±50° C. The raw materials are fluorgypsum and silica sand. Potassium oxide, ceria, magnesium sulfate and cesium sulfate mixed with a mass ratio of 2:3:10:1 are used as catalytic activator. Firstly, flurogypsum is dried at 300° C. to be fully dehydrated, and flurogypsum, silica sand and catalytic activator are mixed with a mass ratio of 62%:33%:5%, and grinded to form powder with 6.3% residue on a sieve of 200 meshes. After being mixed with 3.5% bentonite, the powder is pressed into block-like solids, which are stacked in the cart of the tunnel kiln. After a treatment of reinforcing sealing, oxygen-rich combustion of industrial oxygen is used to supply heat. The activation is carried out at said temperature for 55 min, and the gas is extracted at a negative pressure, and then treated at a lowered temperature and absorbed by acid. By calculation, the replacement rate of sulfur trioxide in gypsum is 96.7%. The block-like solid maintains its shape, with a size shrinkage of 9.3%, a compressive strength of 19.5 MPa and a flexural strength of 4.3 MPa. Chemical analysis shows the solid comprises 1.5 wt % sulfur trioxide, and diffraction analysis shows its main component is rankinite.

EXAMPLE 9

Example 9 differs from Example 8 only in that the temperature is controlled at 950±50° C. By calculation, the replacement rate of sulfur trioxide in gypsum is 97.0%. After reaction, the block-like solid maintains its shape, with a size shrinkage of 9.6%, a compressive strength of 19.8 MPa and a flexural strength of 4.6 MPa. Chemical analysis shows the solid comprises 1.2 wt % sulfur trioxide, and diffraction analysis shows its main component is rankinite.

The invention claimed is:

1. A process for directly producing sulfur trioxide and sulfuric acid using gypsum as raw material, wherein sulfur trioxide in gypsum is directly replaced with silica dioxide through thermal activation or light quantum activation under the assistance of catalytic activation, while restraining reducing atmosphere and removing the resultant sulfur trioxide in time, wherein the chemical reactions that occur comprise,

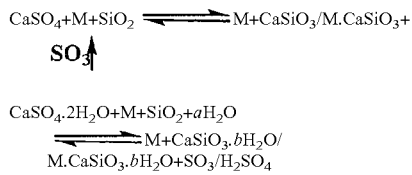

$$CaSO_4 + M + SiO_2 \rightleftharpoons M + CaSiO_3 / M \cdot CaSiO_3 + SO_3 \uparrow$$

$$CaSO_4 \cdot 2H_2O + M + SiO_2 + aH_2O \rightleftharpoons M + CaSiO_3 \cdot bH_2O / M \cdot CaSiO_3 \cdot bH_2O + SO_3 / H_2SO_4$$

wherein M is the catalytic activator, and a and b prefixed to $H_2O$ are 1, 2 or 3;

then the resultant sulfur trioxide is used as raw material to produce sulfuric acid by well-known methods in the art.

2. The process for directly producing sulfur trioxide and sulfuric acid using gypsum as raw material according to claim 1, wherein the heat source for activation and the method of activation are selected from one of the following five Solutions, Solution 1, using overheated water vapor with a temperature higher than or equal to 350° C. as said heat source for thermal activation; directly thermally activating the homogeneous mixture of powders or lumps of gypsum, silica dioxide and catalytic activator in the reaction vessel via media; then unintermittently exporting the mixture comprising the resultant sulfur trioxide and water vapor containing acid, Solution 2, using electric furnace as the heat source for said thermal activation; controlling the temperature of the thermoelectric activation to be higher than or equal to 500° C.; directly thermally activating the homogeneous mixture of powders or lumps of gypsum, silica dioxide and catalytic activator; then extracting the resultant sulfur trioxide gas at a negative pressure, Solution 3, using microwave quantum activation as said method of activation; controlling the temperature to be higher than or equal to 300° C.; directly activating the homogeneous mixture of powders or lumps of gypsum, silica dioxide and catalytic activator; then extracting the resultant sulfur trioxide gas at a negative pressure, Solution 4, using the combustion of coal powder, fuel oil or gas as the heat source for said thermal activation; under a temperature higher than or equal to 700° C., thermally activating the homogeneous mixture of gypsum, silica dioxide and catalytic activator in a multi-stage cyclone preheater rotary kiln, a multi-stage cyclone preheater boiling furnace, an annular kiln or a tunnel kiln; then exporting the resultant sulfur trioxide, Solution 5, using complex activation process as said heat source for said thermal activation; using the combustion of fuel to preheat the homogeneous mixture of powders or lumps of gypsum, silica dioxide and catalytic activator to a temperature higher than or equal to 300° C.; then feeding the mixture into the reaction vessel for being activated by the heat water vapor as heat media, or feeding the mixture into the reaction furnace to be activated by microwave quantum or plasma, and exporting the resultant sulfur trioxide, said homogeneous mixture of powder or lumps of gypsum, silica dioxide and catalytic activator means the reactant prepared in advance with the following mass ratio: 30 to 75% gypsum, 20 to 69% silica dioxide, and 0 to 5.0% catalytic activator;

after being prepared according to said ratio, these ingredients are mixed and grinded into powder with less than 30% residue on a sieve of 200 meshes; or each solid ingredient is separately grinded into powders with less than 30% residue on a sieve of 200 meshes, and then all ingredients are mixed homogeneously; said lumps means spherical or strip-like or lumpish or plate-like reactant made by plasticization after adding 1 to 5% plasticizing binder bentonite or water glass into powdery reactant mixture;

said catalytic activator means the catalytic active substance that can effectively reduce the activation energy of said reaction participated by calcium sulfate and silica dioxide, enhance the positive reaction speed, and restrain the generation of byproduct sulfur dioxide.

3. The process for directly producing sulfur trioxide and sulfuric acid using gypsum as raw material according to claim 2, wherein the catalytic activator is the mixture of at least two of oxides, hydroxides or salts of metal selected from lithium, sodium, potassium, magnesium, strontium, iron, nickel, cobalt, vanadium, chromium, cerium, lanthanum and cesium.

4. The process for directly producing sulfur trioxide and sulfuric acid using gypsum as raw material according to claim 2, wherein the catalytic activator is the mixture of at least two of potassium oxide, potassium hydroxide, potassium sulfate, cesium sulfate, ferric oxide, cerium dioxide, vanadium pentoxide.

5. The process for directly producing sulfur trioxide and sulfuric acid using gypsum as raw material according to claim 1, wherein the gypsum is dihydrate gypsum and/or anhydrite in natural gypsum, or waste gypsum with the sulfur trioxide grade higher than 40%.

6. The process for directly producing sulfur trioxide and sulfuric acid using gypsum as raw material according to claim 5, wherein said waste gypsum with the sulfur trioxide grade higher than 40% is one or several selected from desulfurization gypsum, phosphogypsum, fluorgypsum or lemon gypsum in the industrial waste gypsum.

7. The process for directly producing sulfur trioxide and sulfuric acid using gypsum as raw material according to claim 1, wherein said silica dioxide is silica sand, silica stone and high silica earth existing in the nature, or the silicon ash generated in the production of industrial furnace smelted crystalline silicon or ferrosilicon, or waste glass dust.

8. The process for directly producing sulfur trioxide and sulfuric acid using gypsum as raw material according to claims 7, wherein the total content of carbon and organic impurities in said silica sand, silica stone, high silica earth or waste glass dust is less than 1%.

9. The process for directly producing sulfur trioxide and sulfuric acid using gypsum as raw material according to claim

2, wherein the gypsum is dihydrate gypsum and/or anhydrite in natural gypsum, or waste gypsum with the sulfur trioxide grade higher than 40%.

10. The process for directly producing sulfur trioxide and sulfuric acid using gypsum as raw material according to claim 3, wherein the gypsum is dihydrate gypsum and/or anhydrite in natural gypsum, or waste gypsum with the sulfur trioxide grade higher than 40%.

11. The process for directly producing sulfur trioxide and sulfuric acid using gypsum as raw material according to claim 4, wherein the gypsum is dihydrate gypsum and/or anhydrite in natural gypsum, or waste gypsum with the sulfur trioxide grade higher than 40%.

12. The process for directly producing sulfur trioxide and sulfuric acid using gypsum as raw material according to claim 9, wherein said waste gypsum with the sulfur trioxide grade higher than 40% is one or several selected from desulfurization gypsum, phosphogypsum, fluorgypsum or lemon gypsum in the industrial waste gypsum.

13. The process for directly producing sulfur trioxide and sulfuric acid using gypsum as raw material according to claim 10, wherein said waste gypsum with the sulfur trioxide grade higher than 40% is one or several selected from desulfurization gypsum, phosphogypsum, fluorgypsum or lemon gypsum in the industrial waste gypsum.

14. The process for directly producing sulfur trioxide and sulfuric acid using gypsum as raw material according to claim 11, wherein said waste gypsum with the sulfur trioxide grade higher than 40% is one or several selected from desulfurization gypsum, phosphogypsum, fluorgypsum or lemon gypsum in the industrial waste gypsum.

15. The process for directly producing sulfur trioxide and sulfuric acid using gypsum as raw material according to claim 2, wherein said silica dioxide is silica sand, silica stone and high silica earth existing in the nature, or the silicon ash generated in the production of industrial furnace smelted crystalline silicon or ferrosilicon, or waste glass dust.

16. The process for directly producing sulfur trioxide and sulfuric acid using gypsum as raw material according to claim 3, wherein said silica dioxide is silica sand, silica stone and high silica earth existing in the nature, or the silicon ash generated in the production of industrial furnace smelted crystalline silicon or ferrosilicon, or waste glass dust.

17. The process for directly producing sulfur trioxide and sulfuric acid using gypsum as raw material according to claim 4, wherein said silica dioxide is silica sand, silica stone and high silica earth existing in the nature, or the silicon ash generated in the production of industrial furnace smelted crystalline silicon or ferrosilicon, or waste glass dust.

18. The process for directly producing sulfur trioxide and sulfuric acid using gypsum as raw material according to claim 16, wherein the total content of carbon and organic impurities in said silica sand, silica stone, high silica earth or waste glass dust is less than 1%.

19. The process for directly producing sulfur trioxide and sulfuric acid using gypsum as raw material according to claim 17, wherein the total content of carbon and organic impurities in said silica sand, silica stone, high silica earth or waste glass dust is less than 1%.

20. The process for directly producing sulfur trioxide and sulfuric acid using gypsum as raw material according to claim 18, wherein the total content of carbon and organic impurities in said silica sand, silica stone, high silica earth or waste glass dust is less than 1%.

* * * * *